United States Patent
Bramley, Jr.

(10) Patent No.: US 10,275,271 B2
(45) Date of Patent: Apr. 30, 2019

(54) VIRTUAL MACHINE DEVICE ACCESS

(71) Applicant: HEWLETT-PACKARD DEVELOPMENT COMPANY, L.P., Houston, TX (US)

(72) Inventor: Richard A. Bramley, Jr., Mansfield, MA (US)

(73) Assignee: Hewett-Packard Development Company, L.P., Spring, TX (US)

( * ) Notice: Subject to any disclaimer, the term of this patent is extended or adjusted under 35 U.S.C. 154(b) by 56 days.

(21) Appl. No.: 15/308,973

(22) PCT Filed: Jun. 30, 2014

(86) PCT No.: PCT/US2014/044961
§ 371 (c)(1),
(2) Date: Nov. 4, 2016

(87) PCT Pub. No.: WO2016/003434
PCT Pub. Date: Jan. 7, 2016

(65) Prior Publication Data
US 2017/0102959 A1 Apr. 13, 2017

(51) Int. Cl.
*G06F 9/455* (2018.01)
(52) U.S. Cl.
CPC .......... *G06F 9/45558* (2013.01); *G06F 2009/45579* (2013.01)
(58) Field of Classification Search
None
See application file for complete search history.

(56) References Cited

U.S. PATENT DOCUMENTS

| | | |
|---|---|---|
| 6,820,164 B2 * | 11/2004 | Holm .................... G06F 9/4411 710/2 |
| 8,037,210 B2 | 10/2011 | Tang et al. |
| 8,650,565 B2 | 2/2014 | Narasimhan et al. |
| 8,667,496 B2 | 3/2014 | Levin et al. |
| 2004/0243534 A1 | 12/2004 | Culter et al. |
| 2007/0006227 A1 | 1/2007 | Kinney et al. |
| 2008/0022376 A1 | 1/2008 | Ke et al. |
| 2009/0063835 A1 | 3/2009 | Yao et al. |
| 2011/0184993 A1 | 7/2011 | Chawla et al. |
| 2014/0130039 A1 | 5/2014 | Chaplik et al. |
| 2014/0181811 A1 * | 6/2014 | Tsirkin ................ G06F 9/45558 718/1 |

FOREIGN PATENT DOCUMENTS

KR 10-2009-0026286 3/2009

OTHER PUBLICATIONS

Larson, R., et al. "Chapter 2 Hyper-v Overview", Aug. 19, 2009; 26 pages.

* cited by examiner

*Primary Examiner* — Bing Zhao
(74) *Attorney, Agent, or Firm* — HPI Patent Department

(57) ABSTRACT

According to one example, to access at least one computer device from a virtual machine, a control domain accesses a list of at least one device. For each device in the list of devices, a determination is made as to whether the device is to be exposed to a virtual machine, and a table of devices determined to be exposed to the virtual machine is created and provided to the virtual machine. Determining whether a device is to be exposed to a virtual machine is based on at least one device attribute.

17 Claims, 4 Drawing Sheets

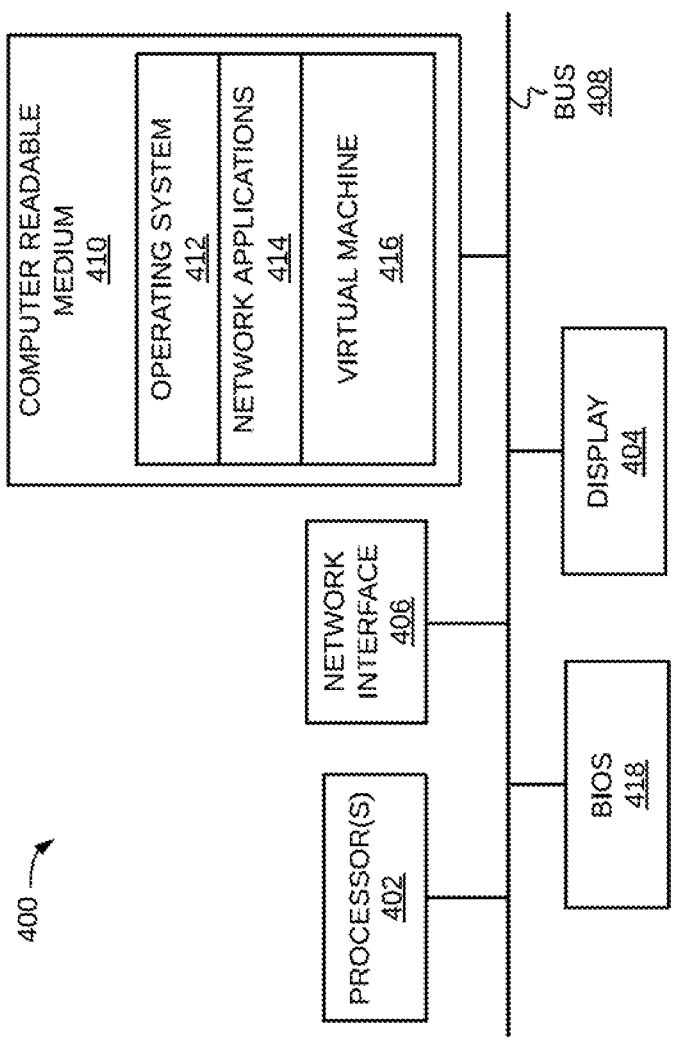

VIRTUAL MACHINE DEVICE ACCESS

BACKGROUND

Virtual machines (or "VMs") are software implementations of a machine, e.g., a computer, or a computer running an operating system, that can execute software programs. Virtual machines can, for example, be used to host operating systems, applications services, and other computer programs, and can provide various functionalities via a host computer. Host computers running a virtual machine may also run a Basic Input/Output System ("BIOS") for, e.g., initializing and testing system hardware upon boot, and for providing other functionality during computer operation.

Virtual machines can be used in various computing environments and/or by different devices. For example, a host computer running a Microsoft Windows operating system may run a virtual machine that also allows the host computer to run a single version of Linux, multiple versions of Linux, other versions of Windows or other instances of the same version of Windows, other Operating systems, or any combination of the above.

BRIEF DESCRIPTION OF THE DRAWINGS

FIG. 4 illustrates a schematic representation of a computing device that may be used as a platform for implementing or executing at least one of the processes depicted in FIG. 3, according to an example of the present disclosure.

DETAILED DESCRIPTION

Figure 1:
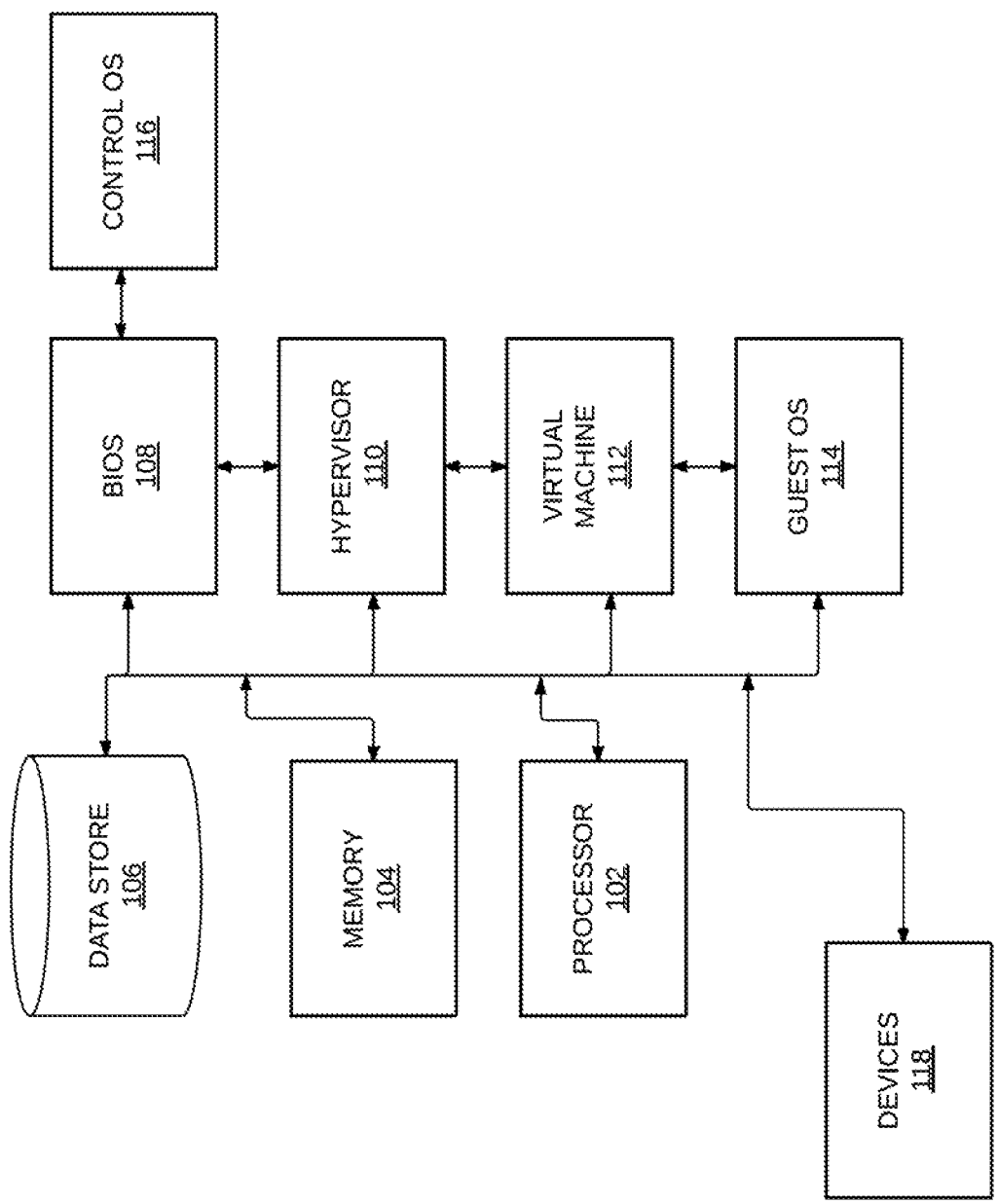
FIG. 1 illustrates a high-level diagram of a computer system 100 with a virtual machine, according an example of the present disclosure.

Companies, organizations, and information technology departments in particular, continuously seek ways to improve computing performance and reduce computing budgets and expenditures. One way to meet this goal may be to employ a strategy utilizing virtual machines, which may allow for server consolidation resulting in lower purchase and maintenance costs for computing hardware.

A virtual machine may be, for example, software and/or hardware-based emulation of a physical machine, e.g., a computer, or more specifically of an operating system. A virtual machine can be hosted by a host system that may include a physical server and/or a physical machine running a hypervisor and/or other virtual machine software.

A hypervisor may be, for example, software that provides a virtualized environment including virtual machines allowing other software, including operating systems, to run on the host machine. A hypervisor may allow a virtual machine to access underlying system hardware and/or the system BIOS, under the control of the BIOS.

Some approaches for providing virtual machines may employ an operating system ("OS") under the control of a hypervisor to present visual representations and/or functional representations of hardware components and/or functions provided by the hardware components and/or the system BIOS under the control of the hypervisor. However, such representations may not be specific to particular types of hardware components and/or particular functions of respective hardware components and/or the BIOS. Moreover, such representations may be based on outdated specifications, or may not allow access to a full range of functionality, e.g., an entire set of functionality provided by the BIOS.

Accordingly, while a host machine may have access to the entire range of functionality provided by a BIOS, a virtual machine may not be able to access the same range of functionality. More specifically, a virtual machine may entirely fail to receive at least some of the functionalities offered by the BIOS, and/or passed through from a control OS.

For example, a host machine may have access to video card controls, such as controls for brightness and other video settings, provided by the BIOS. However, a virtual machine may have no mechanism to access such controls or functionality of the BIOS or the device itself.

Examples of the present disclosure include methods, systems, and computer-readable and executable instructions for virtual machine functionality which may include providing access to a full or fuller range of BIOS functionality to a hypervisor or virtual machine. In some examples, full access to a BIOS or device may allow a virtual machine to provide full functionality of a hardware component or components, e.g., bare metal functionality, to a virtual machine operating system.

More specifically, examples of the present disclosure include methods, systems, and computer-readable and executable instructions for dynamically determining which devices and methods to pass through from a BIOS to a virtualized operating system running on a virtual machine.

FIG. 1 illustrates a high-level diagram of a computer system 100 with a virtual machine, according an example of the present disclosure.

Computer system 100 or "host computer" 100 may include a processor 102, a memory 104, a data store 106, a BIOS 108, a hypervisor 110, a virtual machine 112, and a guest OS 114. In various examples, BIOS 108, hypervisor 110, virtual machine 112, and guest OS 114 may include a combination of hardware and software performing a number of functions described herein, and may include hardware or software to execute one or more modules. The programming can include instructions, e.g., software or firmware, stored in a memory resource, e.g., computer-readable medium, as well as a hard-wired program e.g., logic. As discussed in more detail below, any of BIOS 108, a hypervisor 110, a virtual machine 112, and a guest OS 114 may be coupled to, or communicate with, any of processor 102, memory 104, and/or data store 106.

BIOS 106 may be a Basic Input/Output System to initialize and test system hardware components, and to load an operating system from, e.g., a storage device such as data store 106. Hypervisor 110 may be software that communicates with BIOS 108 to access BIOS 108 and to provide a virtualized environment, i.e., to allow virtual machine 112 or more than one virtual machine to run on host computer 100.

Hypervisor 110 may communicate with a control OS and at least one guest OS to run one or more operating system(s), such as Microsoft Windows or Linux. In some examples, hypervisor 110 may run a control OS without any concurrent guest OS sessions running. In some examples, control OS, e.g., control OS 210, may start the one or more guest OSs, e.g., guest OS 214, following startup of control OS 210, as needed, and as discussed below in more detail with respect to FIG. 2.

As discussed above, various hardware components (or "devices") 118 on host computer 100 may have controls or other settings (or "method") managed or accessible by BIOS 108. Such controls may be, for example, accessible to a primary or control OS on host computer 100, but not a guest OS 114. Such methods, if made accessible to a guest OS, may provide required or desired functionality on the guest OS such as the exemplary video card brightness controls discussed above.

Figure 2:
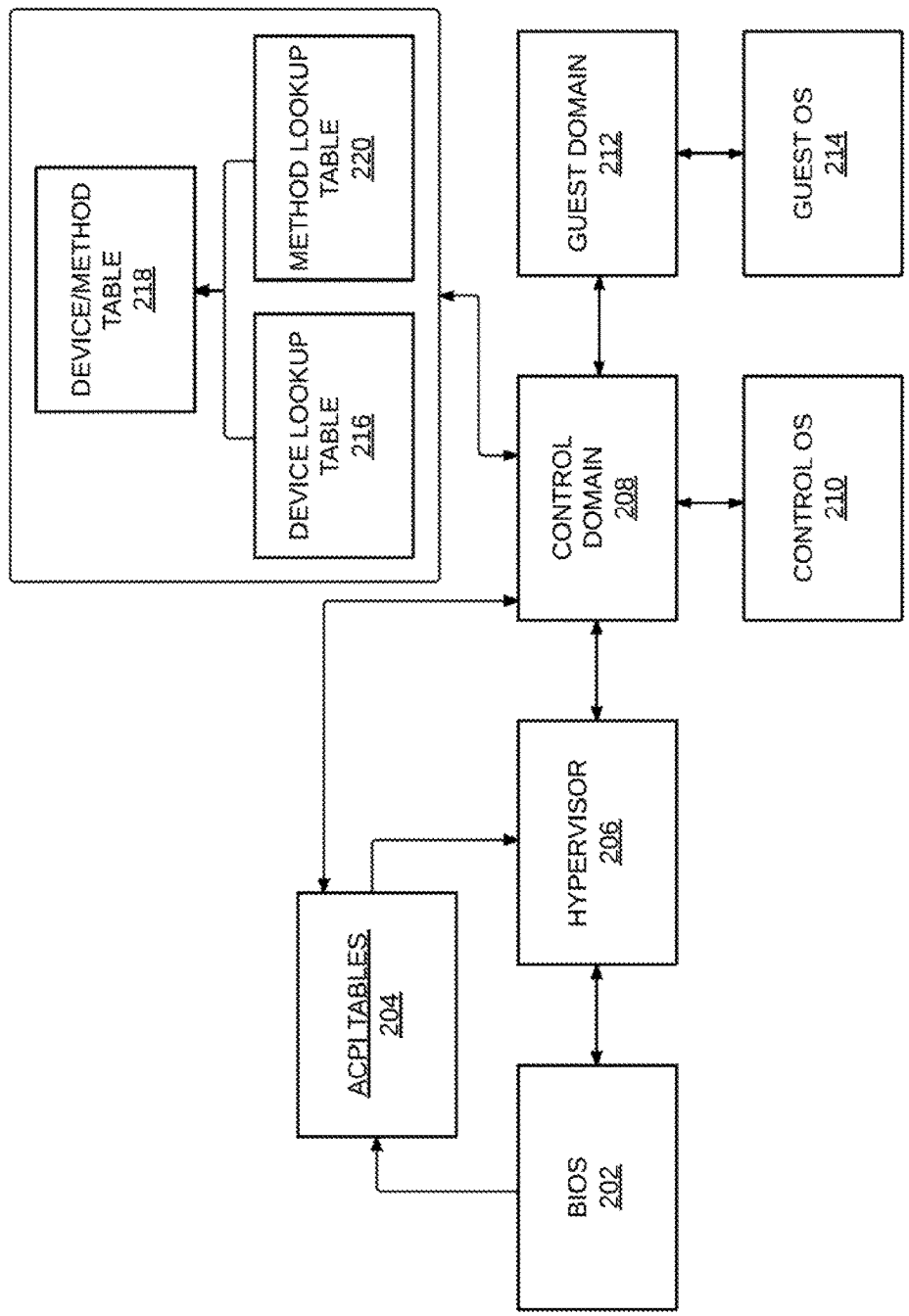
FIG. 2 illustrates a high-level diagram of a computer system 200 with a control domain that determines devices/methods to expose to a virtual machine, according an example of the present disclosure.

FIG. 2 illustrates a high-level diagram of a computer system 200 with a control domain that determines devices methods to expose to a virtual machine, according an example of the present disclosure.

In an example, BIOS 202 may communicate with, or create or update, a number of system tables in memory using a specification for device configuration and power management, such as Advanced Configuration and Power Interface ("ACPI"). The tables 204, e.g. APCI tables, may include values or other settings used by an OS, and may also include machine language, such as ACPI Machine Language ("AML"). AML may, for example, provide functions or "methods" to describe devices on a host computer 200, along with their hierarchal organization. The methods may be used to return information about a device on host computer 200, such as the address of a video card, or may be able to perform some action on a device, such as reporting a brightness level of a video card and changing the brightness level.

Specifications for device configuration and power management such as ACPI may pre-define a number of methods or other functionality provided by, e.g., ACPI. Additional methods, or "helper" methods, may also be written in combination with a custom BIOS or other custom software running on a host computer 200.

ACPI or other specifications may also enable platform abstraction to allow hardware events to trigger a method to be executed, and to notify an OS that an event has happened on a device. For example, ACPI may enable functionality related to hot keys, battery discharge, and AC plug/unplug events. In an example, an OS on host computer 200 may determine a method to execute for an event by using an event number determined by, e.g., a hardware pin being toggled, and whether it is edge or level triggered.

In an example, a hypervisor 206 may communicate with, or create or initialize, a control domain 208, e.g., "dom0". Dom0 may be Linux, or any other OS, and may be a primary or "privileged" OS that has full access to all hardware on host computer 200 and to the BIOS 202. Control domain 208 may communicate with lockup tables 216 and 220, and may communicate with or create device/method table 218.

In an example, lookup tables 216 and 220 are exclusion tables or "blacklists" of devices and/or methods that are not to be loaded into device/method table 218. Lookup tables 216 and 220 may be loaded when a computer system 200 is first shipped, or may be updated at a later time via, e.g., a web download. In other examples, an inclusion table may be used to determine which devices and/or methods are loaded into device/method table 218.

Device/method table 218 may be referred to, in some examples, as a differentiated system description table (DSDT) or a secondary system description table (SSDT). To expose the devices and/or methods available to BIOS 202 to populate device/method table 218, a process may be run to walk through, e.g., the ACPI namespace data structures, to retrieve, e.g., the name, type, and address of each available to BIOS 202. As discussed below in more detail, the devices and methods included into device/method table 218 may comprise a subset of the entire population of devices and methods, based on a determination made by, e.g., a control domain.

In some examples, DSDTs and SSDTs may be interchangeable, and more than one SSDT or DSDT may be used for partitioning purposes.

When a guest OS 21.4 is loaded on guest domain 212, i.e., a less-privileged OS, control domain 208 may communicate with or initialize the guest OS 214. In some examples, more than one guest domain 212 and/or guest OS 214 may be started and may run in parallel.

In some examples, as discussed above, guest domain 212 and guest OS 214 may access only the BIOS 202 and host computer 200 devices and methods that control domain 208 allows access to, or passes through, to guest domain 214. The available devices and methods may be those devices and methods stored in device/method table 218.

In some examples, the guest OS 214, once provided with the contents of the device/method table 218, may request that control domain 208 execute a particular method on behalf of guest OS 214. In some examples, AML stored in device/method table 218 may pass a method and associated parameters to control domain 208, execute a method with the parameters, and pass the results to guest domain 212/ guest OS 214.

In some examples, the flow of FIG. 2 may execute on every boot of, e.g., control domain 208 control OS 210, and/or guest domain 212 guest OS 214 to ensure that device/method table 218 always reflects the status of the current platform. For example, if a hardware configuration is changed, upon the next boot of the host computer, the device/method table 218 will be updated accordingly such that the new devices/methods will be available to, e.g., guest OS 214.

In some examples, ACPI notifications may also be supported. Notifications may be passed through from control domain 208 to guest OS 214 upon an ACPI event occurring. To pass through a notification, control domain 208 may reference the memory address of a device found in an interpreted device table, e.g., a version of ACPI table 204 interpreted by control domain 208. The ACPI event may be mapped to a device ID that is sent to guest OS 214. The device ID is then converted into an ACPI notification for a device using the device/system table 218.

Figure 3:
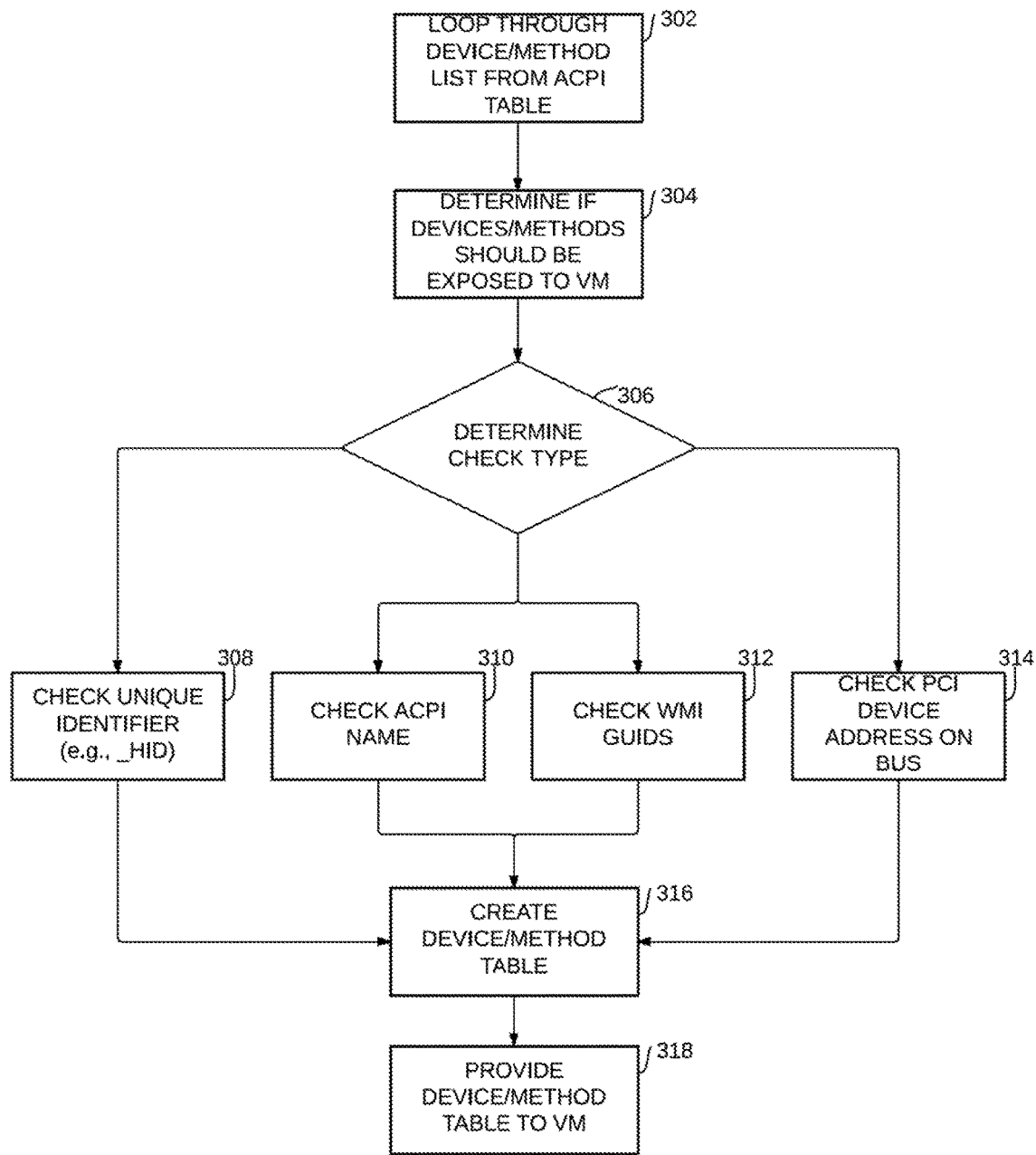
FIG. 3 illustrates a flowchart of determining which devices and/or methods to expose to a virtual machine, according an example of the present disclosure.

FIG. 3 illustrates a flowchart of determining which devices and/or methods to expose to a virtual machine, according an example of the present disclosure.

In block 302, a control domain, e.g., control domain 308, loops through the devices and methods of, e.g., host computer 200 and/or ACPI tables 204 to create a list of devices and, in block 304, to determine if the device or method should be added to the device/method table 218 accessible by the guest OS 214, i.e., whether or not the particular device or method being parsed should be exposed to the virtual machine or operating system based on, e.g., an attribute.

In block 306, a decision is made as to which attribute or "check type" to use to determine if a device or method should be added to the device method table 218 accessible by the guest OS 214.

In block 308, for each device or method, a respective lookup table 216 or 220 is consulted to determine if the device or method should be added to the device/method table 218 accessible by the guest OS 214, i.e., whether or not the particular device or method being parsed should be exposed to the virtual machine or operating system.

In block 310, an ACPI name check is conducted. In some examples, an ACPI name check may employ a lookup table process similar to the lookup tables described herein, i.e., in the preceding paragraph.

In block 312, in an example using Windows Management Instrumentation (WMI), a fixed method may return a set of globally unique identifiers ("GUIDs") and method names associated with each GUM that provide a set of functionality defined by the GUID. For each WMI device, a table of GUIDs exists, and for each GUID in the table, a method is associated with the GUID. When passing-through a GUID, an associated method is also be passed through.

In block 314, the device ID is compared to a PCI device address on a device. In some examples, if a device address matches, the device is passed through, e.g., to guest OS 214. In some examples, if a device address does not match, the device is not passed through. A PCI address may be obtained by calling an ACPI method on control domain 208 from ACPI tables 204.

In block 316, the device/method table 218 is created, and in block 318, the device/method table or tables are transmitted to the virtual machine, or made accessible to the virtual machine via the control domain.

FIG. 4 illustrates a schematic representation of a computing device that may be used as a platform for implementing or executing at least one of the processes depleted in FIG. 4, according to an example of the present disclosure.

Some or all of the operations set forth in the figures may be contained as a utility, program, or subprogram in any desired computer readable storage medium, or embedded on hardware. In addition, the operations may be embodied by machine-readable instructions. For example, they may exist as machine-readable instructions in source code, object code, executable code, or other formats.

Computing device 400 may represent a computing device that comprises. e.g., BIOS 418. The device 400 may include a processor 402 such as a central processing unit; a display device 404, such as a monitor or other digital display; a network interface 406, such as a Local Area Network LAN card, a wireless 802.11x LAN card, a 3G or 4G mobile WAN or a WiMax WAN card; and a computer-readable medium 410. Each of these components may be operatively coupled to a bus 408. For example, the bus 408 may be EISA, PCI, USB, FireWire, NuBus, or PDS.

The computer readable medium 410 may be any suitable medium that participates in providing instructions to the processor(s) 402 for execution. For example, the computer readable medium 410 may be non-volatile media, such as an optical or a magnetic disk; and volatile media, such as memory. Transmission media can also take the form of acoustic, light, or radio frequency waves. The computer readable medium 410 may also store other machine-readable instructions, including instructions downloaded from a network or the internet.

The computer-readable medium 410 may also store an operating system 412 or primary operating system, such as Microsoft Windows, Mac OS, Unix, or Linux; network applications 414; and one or more virtual machines 416. The operating system 412 may be multi-user, multiprocessing, multitasking, multithreading, real-time, and the like. The operating system 412 may also perform basic tasks, such as recognizing input from input devices, such as a keyboard or a keypad; sending output to the display 404; keeping track of files and directories on medium 410; controlling peripheral devices, such as drives, printers, or image capture devices; and managing traffic on the bus 408. The network applications 414 may include various components for establishing and maintaining network connections, such as machine readable instructions for implementing communication protocols including but not limited to TCP/IP, HTTP, Ethernet, USB, and Fire-Wire.

The BIOS 418 may provide various machine readable instructions for managing access between system devices, system methods, and virtual machines 416, as described above. In certain examples, some or all of the processes performed may be integrated into BIOS 418 or the operating system 410. In certain examples, the processes may be at least partially implemented in digital electronic circuitry, in computer hardware, in machine readable instructions (such as firmware and/or software), or in any combination thereof.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method of accessing at least one computer device from a virtual machine, said method comprising:
accessing, from a control domain, a list of at least one device;
for each device in the list of devices, determining whether the device is to be exposed to the virtual machine;
creating a table of devices determined to be exposed to the virtual machine; and
providing the table of devices to the virtual machine,
wherein determining whether the device is to be exposed to the virtual machine is based on at least one device attribute, wherein the determining of whether the device is to be exposed to the virtual machine comprises the control domain referencing a lookup table identifying attributes of basic input/output system (BIOS) devices, wherein the attributes are to serve as a basis for selectively excluding or including particular BIOS devices presently in a computer system for being exposed to the virtual machine and wherein the creating of the table of devices determined to be exposed to the virtual machine comprises selectively adding a candidate BIOS device from the list of devices to the table of devices based upon a comparison of attributes of the candidate BIOS device to the attributes of the lookup table.

2. The method of claim 1, wherein determining whether the device is to be exposed to the virtual machine based on at least one device attribute comprises checking a lookup table.

3. The method of claim 1, wherein determining whether the device is to be exposed to the virtual machine based on at least one device attribute comprises checking an ACPI name.

4. The method of claim 1, wherein determining whether the device is to be exposed to the virtual machine based on at least one device attribute comprises checking a unique identifier.

5. The method of claim 1, wherein determining whether the device is to be exposed to the virtual machine based on at least one device attribute comprises checking a PCI bus address.

6. The method of claim 1, wherein the devices comprise device methods.

7. The method of claim 1, wherein providing the table of devices to the virtual machines enables device notifications.

8. The method of claim 1, wherein the determining of whether the device is to be exposed to the virtual machine comprises the control domain comparing attributes of the device with attributes found in an exclusion table of device and method attributes that are not to be exposed to the virtual machine.

9. The method of claim 1, wherein the determining of whether the device is to be exposed to the virtual machine comprises the control domain comparing attributes of the device with attributes found in an inclusion table of device and method attributes permissible for exposure to the virtual machine.

10. A computer system comprising:
a basic input/output system to provide a list of at least one device;
a hypervisor to provide at least one domain;
a control domain to determine, for each device in the list of devices, whether the device is to be exposed to a virtual machine; and
a virtual domain to receive a table of devices determined to be exposed to the virtual machine,
wherein the determining of whether the device is to be exposed to the virtual machine comprises the control domain referencing a lookup table identifying attributes of basic input/output system (BIOS) devices, wherein the attributes are to serve as a basis for selectively excluding or including particular BIOS devices presently in a computer system for being exposed to the virtual machine and wherein the table of devices determined to be exposed to the virtual machine comprises a candidate BIOS device that is been selectively added from the list of devices to the table of devices based upon a comparison of attributes of the candidate BIOS device to the attributes of the lookup table.

11. The system of claim 10, wherein determining whether the device is to be exposed to the virtual machine based on at least one device attribute comprises checking a lookup table.

12. The system of claim 10, wherein determining whether the device is to be exposed to the virtual machine based on at least one device attribute comprises checking an ACPI name.

13. The system of claim 10, wherein determining whether the device is to be exposed to the virtual machine based on at least one device attribute comprises checking a unique identifier.

14. The system of claim 10, wherein determining whether the device is to be exposed to the virtual machine based on at least one device attribute comprises checking a PCI bus address.

15. The system of claim 10, wherein the devices comprise device methods.

16. The system of claim 10, wherein receiving the table of devices enables device notifications.

17. A non-transitory computer readable storage medium on which is embedded a computer program, said computer program to manage access to at least one computer device from a virtual machine, said computer program comprising a set of instructions to:
access, from a control domain, a list of at least one device;
for each device in the list of devices, determine whether the device is to be exposed to the virtual machine;
create a table of devices determined to be exposed to the virtual machine; and
provide the table of devices to the virtual machine,
wherein the determining of whether the device is to be exposed to the virtual machine comprises the control domain referencing a lookup table identifying attributes of basic input/output system (BIOS) devices, wherein the attributes are to serve as a basis for selectively excluding or including particular BIOS devices presently in a computer system for being exposed to the virtual machine and wherein the table of devices determined to be exposed to the virtual machine comprises a candidate BIOS device that is been selectively added from the list of devices to the table of devices based upon a comparison of attributes of the candidate BIOS device to the attributes of the lookup table.

* * * * *

UNITED STATES PATENT AND TRADEMARK OFFICE
CERTIFICATE OF CORRECTION

PATENT NO. : 10,275,271 B2  
APPLICATION NO. : 15/308973  
DATED : April 30, 2019  
INVENTOR(S) : Richard A. Bramley, Jr.

Page 1 of 1

It is certified that error appears in the above-identified patent and that said Letters Patent is hereby corrected as shown below:

On the Title Page

In Column 1, item (73), Assignee, Line 1, delete "Hewett-Packard" and insert -- Hewlett-Packard --, therefor.

Signed and Sealed this
Twenty-first Day of April, 2020

Andrei Iancu
*Director of the United States Patent and Trademark Office*